United States Patent [19]

Packo et al.

[11] 4,304,805

[45] Dec. 8, 1981

[54] SEALING LEAKS BY POLYMERIZATION OF VOLATILIZED AMINOSILANE MONOMERS

[75] Inventors: Joseph J. Packo, 11208 Pinehurst Dr., Austin, Tex. 78747; Donald L. Bailey, Traverse City, Mich.

[73] Assignee: Joseph J. Packo, Austin, Tex.

[21] Appl. No.: 169,478

[22] Filed: Jul. 15, 1980

Related U.S. Application Data

[63] Continuation-in-part of Ser. No. 966,327, Dec. 4, 1978, Pat. No. 4,237,172.

[51] Int. Cl.$^3$ ............................................. B32B 35/00
[52] U.S. Cl. ......................................... 428/63; 48/194; 73/49.3; 106/33; 106/287.11; 138/97; 156/94; 166/294; 166/295; 252/374; 264/36; 405/264; 427/140; 427/142; 427/237; 427/255.2; 427/248.1; 528/28; 556/410; 427/255.1
[58] Field of Search ................ 106/33, 287.11; 138/97, 138/98; 156/94; 166/294, 295; 252/374; 264/36; 405/264; 427/140, 142, 237, 248 A, 248 B, 248 R; 428/63; 528/28; 556/410; 48/194; 73/49.3

[56] References Cited

U.S. PATENT DOCUMENTS

| | | | |
|---|---|---|---|
| 2,259,875 | 10/1941 | Bent et al. | 166/294 X |
| 2,265,962 | 12/1941 | Bent et al. | 166/22 |
| 2,566,363 | 9/1951 | Pedlow et al. | 556/410 |
| 2,570,719 | 10/1951 | Rudel et al. | 252/49.6 |
| 2,579,418 | 12/1951 | Cheronis . | |
| 2,624,721 | 1/1953 | Hatcher et al. | 260/46.5 |
| 2,635,059 | 4/1953 | Cheronis . | |
| 2,876,209 | 3/1959 | deBenneville et al. | 260/45.4 |
| 2,876,234 | 3/1959 | Hurwitz et al. | 260/326.5 |
| 3,007,886 | 11/1961 | Parker | 260/18 |
| 3,036,019 | 5/1962 | Molotsky et al. . | |
| 3,043,798 | 7/1962 | Boyer et al. | 260/46.5 |
| 3,054,818 | 9/1962 | Pepe et al. | 556/410 |
| 3,098,830 | 7/1963 | Rochow . | |
| 3,133,108 | 5/1964 | Finestone | 556/410 |
| 3,133,110 | 5/1964 | Morehouse et al. | 556/410 |
| 3,187,030 | 6/1965 | Boyer et al. | 106/287.11 X |
| 3,305,525 | 2/1967 | Goosens | 260/46.5 |
| 3,361,547 | 1/1968 | Packo | 48/193 |
| 3,467,686 | 9/1969 | Creamer | 556/410 |
| 3,483,735 | 12/1969 | Packo | 73/40.7 |
| 3,483,736 | 12/1969 | Anderson | 73/40.7 |
| 3,507,725 | 4/1970 | Hylak | 156/94 |
| 3,523,771 | 8/1970 | Anderson | 48/193 |
| 3,530,092 | 9/1970 | Borchert | 260/46.5 |
| 3,572,085 | 3/1971 | Packo | 74/40.5 |
| 3,578,479 | 5/1971 | Packo | 138/97 X |
| 3,578,490 | 5/1971 | Bauer et al. . | |
| 3,580,939 | 5/1971 | Ceyzeriat et al. | 556/410 |
| 3,608,000 | 9/1971 | Anderson | 264/36 |
| 3,634,560 | 1/1972 | Anderson | 264/36 |
| 3,660,984 | 5/1972 | Anderson | 61/36 R |
| 3,709,712 | 1/1973 | Rossman | 138/97 X |
| 3,711,305 | 1/1973 | Anderson | 106/33 |
| 3,711,309 | 1/1973 | Packo | 264/36 X |
| 3,716,384 | 2/1973 | Anderson | 106/33 |
| 3,923,736 | 12/1975 | Nitzsche et al. | 260/46.5 G |
| 4,026,976 | 5/1977 | Anderson | 264/36 |
| 4,074,536 | 2/1978 | Young | 166/295 X |

OTHER PUBLICATIONS

Wilson et al., "Detection, Repair, and Prevention of Gas Leaks," American Gas Journal, v. 186, No. 8 (Aug., 1959) pp. 16-28.

*Primary Examiner*—John T. Goolkasian
*Assistant Examiner*—Robert A. Dawson
*Attorney, Agent, or Firm*—Browdy & Neimark

[57] ABSTRACT

Leaks in a vessel or pipeline or the like adapted for containing a fluid, are sealed by means of a volatilized polymerizable aminosilane supplied to the interior of the vessel under sufficient pressure and for a sufficient period of time to permit contact thereof and react in the presence of moisture or sand at the situs of the leak to provide a solid polysiloxane seal.

15 Claims, No Drawings

SEALING LEAKS BY POLYMERIZATION OF VOLATILIZED AMINOSILANE MONOMERS

This is a continuation-in-part of parent copending application Ser. No. 966,327 filed Dec. 4, 1978 and now U.S. Pat. No. 4,237,172.

FIELD OF THE INVENTION

The present invention relates to sealing leaks in pipes, conduits, closed containers, tanks, and closed systems adapted to contain or transport fluids. The invention is particularly adapted for sealing leaks in buried pipes for conveying fuel gas and also for sealing leaks in telephone conduits containing nitrogen or other inert gas under pressure.

BACKGROUND OF THE INVENTION

In an article entitled "Detection, Repair, and Prevention of Gas Leaks", published in the American Gas Journal, August 1959, pages 16-28, it is indicated that the amount of fuel gas lost from pipelines through leakage represents a great economic burden as well as a potential safety hazard. In addition, leakage of fuel gas reduces the effective capacity of a gas distribution system. Another adverse effect of leakage is a reduction in the level of pressure in the distribution mains below desirable limits.

In U.S. Pat. No. 3,507,725 to Hylak et al., there is disclosed a method of repairing gas main fibrous packed joints with a liquid sealing material which may be a liquid monomer such as styrene monomer, by introducing the monomer into the gas main in liquid form, and permitting it to flow to a low point in the system where a leaking joint exists, the packing of which becomes saturated with the sealant which then polymerizes over a relatively long period of time, namely six weeks to three months. Styrene is employed as a liquid, and no specific catalyst is named in the patent.

The U.S. Pat. No. 3,578,479 to Packo discloses sealing leaks in a vessel and the like with a sealant agent which is either a silicon hydride, a boron hydride or an alkoxide borane, together preferably with a metal alkyl. To achieve best results from the disclosed components, this system requires the use of the metal alkyl, a dangerously pyrophoric material, as a co-reactant. Moreover, such metal alkyls have a poor shelf life and are easily subject to contamination. The seal produced by the co-reaction has a tendency to be brittle and lacks consistency and homogeneity due to stratifications which inevitably occur in the mixtures and differences in volatility curves in the components which give different relative concentrations at different temperatures.

Likewise, U.S. Pat. No. 3,608,000 to Anderson discloses the introduction into a vessel of sealants which are mixtures of volatile organosilanes and metal alkyls which interact chemically to form solid products in accordance with the equations set forth at column 2, lines 4-5 of the patent. These systems, again requiring the same metal alkyl co-reactants or catalysts as required in U.S. Pat. No. 3,578,479, suffer the same disadvantages.

Bent et al. U.S. Pat. No. 2,265,962 discuss in general the use of silanes for sealing wells by reaction of the silane with water to form an insoluble shield or plug. Among the silanes mentioned are those containing nitrogen groups including the following four compounds: $Si(NH_2)(OC_2H_5)_3$; $Si(NH_2)(OCH_3)_3$; $Si(NO_2)(OC_2H_5)_3$; $Si(OC_2H_4NH_2)_4$. These compounds are either too unstable or too low in volatility to be practical for use in gas phase sealing. Similarly, U.S. Pat. No. 2,259,875 to Bent et al. also relates to a process for treating leaks in the walls of gas boreholes using silane compounds; but only four of the compounds disclosed contain nitrogen, and these are not aminosilanes.

The Ceyzeriat U.S. Pat. No. 3,580,939 discloses the use of aminosilanes as cross-linking agents for diorganopolysiloxane compositions. These liquid compositions, which harden spontaneously in the presence of water, are suggested for joining slabs and pipes.

Anderson U.S. Pat. No. 4,026,976 shows the sealing of pipe leaks using a catalytically polymerizable volatile organic monomer, but this process undesirably shows the use of a catalyst which consequently complicates the processing and increases the cost.

In addition to the Anderson patents mentioned above, a number of other prior patents show the use of volatile mixtures for pipe sealing. These include the Anderson U.S. Pat. Nos. 3,634,560; 3,711,305; 3,716,384; Packo U.S. Pat. No. 3,483,735; and Anderson U.S. Pat. No. 3,660,984. Also of interest in this regard is the Rossman U.S. Pat. No. 3,709,712 which relates to the use of volatile organic amines; and Packo U.S. Pat. No. 3,711,309 which relates to the use of volatile alcohol or glycol ethers. Of somewhat less interest are the patents to Anderson U.S. Pat. Nos. 3,483,736; 3,523,711; Packo U.S. Pat. No. 3,572,085; and U.S. Pat. No. 3,361,547, which relate to the detection of gas leaks.

In spite of all the work which has been done in the field of gas phase sealing, as noted above, most sealing of gas containing pipe continues to be carried out by archaically attempting to locate the leak, then excavating at the believed site of the leak, followed by applying a physical patch to the leak. Dogs are still being trained to sniff-out gas leaks, although flame ionization is often used; these are both expensive techniques, and very often are unable to pinpoint the leak site, as gas may leak from one point and travel along the pipe for a considerable distance before reaching the surface where it can be detected. Also excavation is not only expensive but is impractical in some cases as where gas lines pass beneath large buildings.

Significant sealing problems also continue to occur in other gas containing conduits as well. Both above-ground and under-ground telephone conduits cannot tolerate moisture, as moisture tends to impregnate the dielectric material separating the telephone wires with the result that cross-talk occurs between adjacent lines; this problem is presently controlled at great expense by constantly feeding dry gas, e.g. nitrogen under pressure through the telephone conduit. Problems of gas leakage also occur in many other environments including chemical processing plants and air conditioning units.

SUMMARY OF THE INVENTION

It is, accordingly, an object of the invention to overcome deficiencies in the prior art, such as indicated above.

It is another object of the present invention to provide for the improved sealing of leaks in pipes, pipelines, conduits, tubing and vessels using a gaseous aminosilane or a mixture of gaseous aminosilanes.

It is another object to provide for an improved process for sealing leaks in pressurized pipes, pipelines and vessels which provide a better seal, which is safer, and which uses materials which are more stable and non-pyrophoric.

It is a further object to provide improved pipe seals which are more flexible and less brittle and therefore less likely to fail in the event of movement of the pipe, e.g. in the event of earth shifts, and which seal is more homogeneous.

It is yet a further object to provide for improved vessel sealing using a volatile, volatilizable or gaseous sealing compound which has good shelf life and is not easily contaminated.

It is yet another object of the present invention to provide for a volatile, volatilized or gaseous sealing composition which may be used by itself and without the presence of a gaseous pyrophoric metal compound or a catalyst.

In accordance with the instant invention there is provided a novel process for sealing leaks in pipes, pipelines and pipe systems, conduits, closed containers, tanks, and closed systems such as air conditioner units adapted to contain gaseous fluids, all of which are referred to generally as a vessel. The process of the invention is particularly adapted for sealing leaks in underground piping systems used for conveying fuel gas, as well as for sealing leaks in telephone conduits containing nitrogen or other inert gas under pressure, air conditioner units containing Freon and other gaseous systems such as chemical plants and refrigeration units.

The invention not only eliminates leakage of gas into the atmosphere, but also into the surrounding soil or through joint packing materials. The air and other surrounding materials which may be involved in the sealing operation are accordingly referred to herein as the ambient environment.

The sealing method of the present invention is particularly adapted for the sealing of leaks in piping systems employing joints of the type sealed by fibrous packings, but it is not to be regarded as limited thereto. Fibrous packed joints are extensively employed in city gas distribution systems in which cast iron pipe sections are connected by bell-and-spigot-type joints caulked with fibrous packing, usually jute fiber. However, the method of the invention may also be employed for sealing small hole-type leaks, such as those caused by corrosion, in the body of the pipe sections. The seal as produced, because of its electrical insulating characteristics, also tends to retard further corrosion induced by electrical effects.

According to the invention, the sealant precursor is introduced into the interior of the vessel under pressure in gaseous form or in volatile liquid form, where it volatilizes within the vessel, at preferably ambient temperature. When the sealant compound begins to escape through any existing leak in the vessel, it reacts with soil or moisture present at the ambient exterior locus of the vessel where the leak exists and polymerizes to form a solid product in situ which seals the leak.

In the embodiments disclosed in parent application Ser. No. 966,327, the sealant precursor is an aminosilane or mixture of aminosilanes. However, the essential characteristics of the invention are maintained even if significant proportions of the aminosilane are replaced by other silanes, it being understood that the dangerous pyrophoric materials should in any event be avoided. Certain advantages, particularly economic advantages, are achieved by the admixture with the aminosilanes of other, less expensive silanes, such as certain alkoxysilanes.

DETAILED DESCRIPTION OF THE INVENTION

The present invention employs the novel principle of sealing a leak in a vessel or pipeline or the like by introducing into the interior of the vessel in vapor form a normally gaseous or volatilizable or volatilized organosilane monomer which is capable of polymerizing in contact with materials in the environment such as moisture, soil or sand, or a combination of these agents. Polymerization is effected at the situs of the leak where, in contact with the polymerization inducing material, the monomer forms a solid polymeric product which acts as a seal.

Where desirable, the pipeline or vessel may be first flushed with an inert gas, before the monomer is introduced. The vapors of the organic monomer are preferably introduced in admixture with a gaseous vehicle or carrier which is inert to the monomer. The inert gaseous vehicle or the flushing gas may be, for example, nitrogen, helium, natural gas, or, in the case of air conditioning units, the Freon itself.

The concentration of monomer vapor employed will depend upon the type of monomer, the type of sealing problem present, the nature and size of the leaks, the environmental conditions of the vessel or pipeline, particularly the moisture level and the pressure and temperature of the carrier gas in the vessel, and the like. In general, the concentration of monomer will be on the order of about 100 to 50,000 parts per million, desirably 200 to 25,000 parts per million, preferably less than 10,000 ppm, and ideally less than 5,000 ppm, but this is to be considered as illustrative, and not as limiting.

The polymerization reaction may take place within a relatively short time, usually a matter of a few hours. On the other hand, when the sealing procedure is carried out dynamically as described below, and the concentration of monomer in the system is maintained at less than 1,000 ppm as is most preferred, the process should be carried out over an extended period, e.g. a couple of months.

Thus, in accordance with one aspect of the practice of the invention, illustrated by the polymerization system in Example 1 below, the aminosilane is introduced into the vessel, in vapor form, or volatilizable liquid form so as to reach the points in vapor form where leakage may be taking place. In the case of an underground pipeline or gas main, the leakage may be taking place at jute packed joints, or at corrosion sites, into the surrounding soil. In such cases a matrix of either jute or soil is available to absorb the aminosilane vapors, providing a site for the polymerization to take place. The monomer is introduced into the vessel under a pressure sufficient to permit escape of its vapors from the leak into the ambient environment.

Sealing may be effected either statically or dynamically. Under static sealing methods, the part of the vessel (e.g. a gas line) to be sealed is isolated from the remainder of the vessel, and such part is then purged of its contents by displacement with carrier gas under pressure and containing the aminosilane vapor, it being understood that the carrier gas may be any gas insert to the aminosilane, e.g. natural or fuel gas where the vessel is a gas line. Under appropriate conditions, pre-flushing or pre-moisturizing may be first carried out. After feeding of the carrier gas aminosilane mixture, the infeed end of the vessel is closed, and the gas is permitted to leak from the leak holes, after which the vessel is tested for tightness. Static sealing may be repeated a plurality of times until the vessel is fully sealed. Static sealing may be faster and therefore preferred when the vessel is relatively small, e.g. a short length of pipeline.

However, dynamic sealing is usually preferred. This may be carried out by feeding the aminosilane monomer continuously or intermittently into the vessel with the usual component carried by the vessel, e.g. natural or fuel gas as the carrier in the case of gas pipelines, or nitrogen as the carrier in the case of telephone conduits. Such feeding may be carried out in the same manner in which odorants are conventionally admixed with natural or fuel gas, e.g. by wicking, spraying or atomizing, or merely pumping the monomer in liquid form into the vessel where it then vaporizes with the flow of carrier gas. In such dynamic sealing, carrier gas with aminosilane vapor continues to leak through each leak hole until it becomes sealed.

In many cases polymerization will take place more effectively after the aminosilane monomer has stopped flowing at the leak site, i.e. either static sealing or intermittent dynamic sealing. Therefore when dynamic sealing is called for, it may be desirable to add the aminosilane intermittently, or alternatively with moisturized carrier gas. Intermittent feeding may also be desirable from an economic viewpoint.

In any event, the aminosilane is supplied either continuously or for a period of time sufficient to allow polymer formation and the establishment of a solid seal at the situs of the leak. This point is usually indicated by a build-up of pressure within the vessel to a steady level.

In the case of a small closed system, such as an automobile air conditioning unit, the aminosilane monomer may be incorporated into the original fluid material, e.g. the Freon, in which case the unit will self-seal as it develops leaks.

When this system is employed to seal a pipeline, such as, for example, a gas main distribution system utilizing jute packed joints, there must be taken into consideration the mode of operation of the line. Some gas systems are used for transmission of dry natural gas, and in these the jute packing may have hardened so that it is difficult for the aminosilane to be taken up by the jute. Also, where the pipeline is buried in very dry environments, a similar problem may exist. In such situations, in order to ensure the presence of adequate moisture at the location of the leak into the surrounding soil, it is desirable to pretreat the line by injection of moisture to the level needed to either render the packing absorptive of moisture or the soil surrounding the leak sufficiently moist to initiate polymerization. Although most soils contain some moisture, under dry conditions it is desirable to introduce sufficient moisture into the system to assure proper polymerization conditions. However, moisture becomes less important where sufficient silica lies adjacent the leak hole.

Injection of the aminosilane may be repeated as many times as required to reach a no-leak condition, e.g. a steady internal pressure indicative of sealing of leakage where static sealing is carried out.

As noted above, the sealant aminosilane gas may be introduced intermittently, alternating with the feed of moisturized carrier gas. Where the carrier gas is natural or fuel gas, the aminosilane can be introduced simultaneously with the odorants and in a similar manner. This system is particularly useful when it is desired to treat the entire gas distribution system simultaneously, for leaks already in existence and for new leaks as they develop.

A key aspect of the present invention is the proper selection of a sealing compound. In accordance with the present invention, such a suitable material is an aminosilane which is volatile at ambient temperatures and which is polymerized by contact with moisture or soil at the situs of the leak. Aminosilanes are in general desirable because they hydrolize rapidly, have good volatility, form a strong polymeric seal, and are substantially non-corrosive. More particularly, the requirements of the sealant compound are as follows:

(1) it must be an aminosilane;

(2) it must have sufficiently high vapor pressure at ambient temperature, i.e. at 30°–190° F., and the internal vessel pressure, to give gas mixtures containing at least 100 parts per million of the sealant vapor, when mixed with the carrier gas and preferably at least 200 parts per million of the aminosilane vapor; and (3) the compound must be monomer and be capable of polymerizing from the vapor state to form a solid silicone polymer or polysiloxane in the presence of moisture or soil.

A co-sealant may be desirably be used in place of a portion of the aminosilane, e.g. such a co-sealant may replace up to 90 mol % of the aminosilane. It must be understood, however, that the co-sealant, also a siliane and not a dangerous pyrophoric material, must also meet requirements (2) and (3) immediately above when used in conjunction with the aminosilane.

In addition, it is desirable that the volatile aminosilane monomer and co-sealant also be environmentally acceptable. It is further desirable that such monomers be non-corrosive and sufficiently stable so that storage presents little difficulty.

It has been found that such a material corresponds generally to the following formula, bearing in mind that the alkyl groups designated must be of relatively short chain length or else the aminosilane will not be volatile at ambient temperatures,

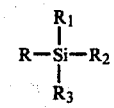

wherein

R is H, halogen or R', and R' is alkyl of 1–4 carbons or vinyl;

$R_1$ is halogen, R', —OR', —NHR' or —N(R')$_2$, preferably R' or —OR';

$R_2$ is halogen, R', —OR', —NHR' or —N(R')$_2$, preferably —OR' or N(R')$_2$; and $R_3$ is —NHR' or —N(R')$_2$, preferably —N(R')$_2$.

Aminosubstituted silane monomers prepared by reacting primary amines with chlorosilane monomers are included, e.g. where one or more of $R_1$ to $R_3$ is NHR'. Examples are:

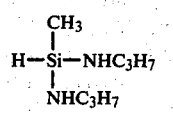

bis(isopropylamino)methylsilane

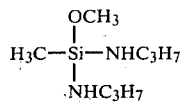

bis-isopropylamino methoxy methylsilane.

Generally, however, aminosilanes made from primary amines are less stable than those made from secondary amines, and therefore these monomers are less practical and are not preferred.

Amino-substituted silane monomers containing halogen attached to the silicon atom are also included, e.g. dimethylamino methyl chlorosilane, dimethylamino dimethyl chlorosilane, dimethylamino methyl dichlorosilane, dimethylamino methyl difluorosilane, dimethylamino dimethyl fluorosilane, etc. However, these also are not preferred, particularly where the vessel to be sealed is of metal, because of their potential to cause corrosion problems, to say nothing of concerns regarding toxicity and environmental impact.

Mixtures of the above compounds may also be used and also mixtures of such compounds with less volatile aminosilanes, so long as the mixture is volatile at the temperature and pressure of use. In general, it is desired that the aminosilane or mixture thereof be volatile at 30° F., i.e. at least 100 parts per million and preferably 200 parts per million in the gaseous atmosphere.

Of useful materials which fall within the general formula above, that most preferred is bis-(dimethylamino)-methylsilane

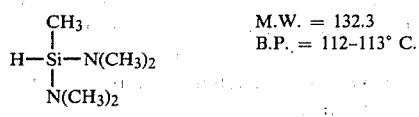

Other useful aminosilanes and mixtures thereof are as follows:

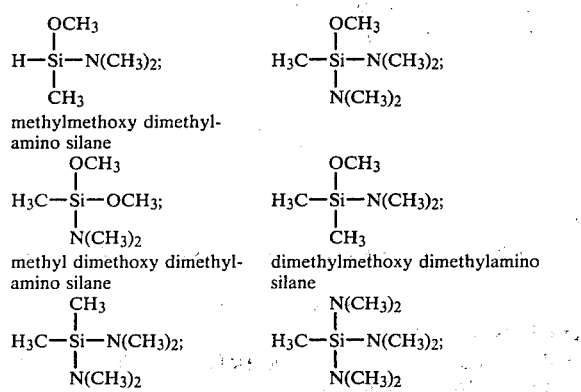

bis-(dimethylamino)dimethylsilane in combination with tris(dimethylamino)methylsilane, the latter being used in quantities of 1–5% of the silane blend; mixtures of the above listed aminosilanes.

The co-sealant monomers may be selected from a wide variety of alkoxysilanes. Particularly effective has been found to be a mixture of 30 wt % aminosilane, most preferably bis-(dimethylamino)methylsilane, approximately 60 wt % vinyl trimethoxysilane and 10 wt % tetramethoxysilane.

Other possible mixtures include aminosilanes with acetoxysilanes. While acetoxysilanes, such as dimethyl-dicacetoxysilane (b.p. 170° C.) and methyl-triacetoxysilane (b.p. 210° C.) are less volatile than the aminosilanes, they can be used in the dynamic process at relatively dilute concentrations of 200–1000 ppm. On the other hand, the acetoxysilanes are not suitable for use in environments where acetic acid cannot be tolerated, as acetic acid will be formed on hydrolysis of the silane.

Another group of co-sealants which may be used with the aminosilanes are thio-esters formed from mercaptans. Examples are dimethyl bis(methyl-mercapto)silane and methyl-tris(methyl-mercapto)silane. These co-sealants are not preferred, however, because they are not available commercially, having a strong repulsive odor, and have volatilities higher than desirable, although not so high as to prevent their utilization at low levels in the dynamic process.

The following examples further illustrate without limiting the nature of the invention.

EXAMPLE 1

Bis(dimethylamino)methylsilane was made according to the following reaction scheme:

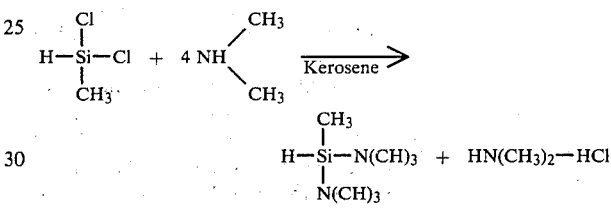

Gaseous dimethylamine was passed through one mole of MeHSiCl$_2$ in 700 ml of kerosene until the reaction was complete. The amine HCl precipitated and was removed from the liquid by filtration. The product was recovered by vacuum distillation.

EXAMPLE 2

A ½×50-inch pipe was drilled with two ⅛-inch holes, two 1/16-inch holes, and two 1/32-inch holes spaced eight inches apart. It was then buried with eight inches of wet sand (15.2% H$_2$O) above and below the pipe. The pipe was then fogged by passing N$_2$ through H$_2$O and then through the pipe for one hour. This was followed by bubbling N$_2$ (cylinder pressure ~5 psi) through a container of the bis(dimethylamino)methylsilane product of Example 1 to volatilize the silane, and then through the pipe. A total of 49.0 of the silane was used in a three-hour sealing period.

After the N$_2$ flow carrying the gaseous aminosilane was stopped, the system was allowed to stand intact for 88 hours. It was then found that the pipe would hold a pressure of 15 psi with no leaks. The sand was dropped from the bottom of the box to reveal the pipe. A small ball of polymer had developed at the site of each hole. The polymer seals had the appearance of mounds of sand and the sand has obviously been incorporated into the polymer. The polymer over one of the 1/16-inch holes was partially removed by cutting into it with a knife. It was found to be a tough, hard material.

The seal that was partially cut away was removed nearly to the original hole. The system was then pressured with nitrogen and checked for leaks with each increase of 10 psi. At 60 psi the system was leak-free, but in the process of charging to 70 psi, the seal which had been partially cut away ruptured. This hole was sealed with a hose clamp and gasket, and the system was then pressured to 100 psi with no leaks at the remaining five seals.

EXAMPLE 3

A ½×50-inch pipe with six 1/16-inch holes spaced eight inches apart was barricaded at intervals so that one hole was buried in wet dirt (soil high in clay and containing ∼20% $H_2O$), two holes were buried in dry sand (0.2% $H_2O$), two holes were buried in wet sand (∼10% $H_2O$), and one hole was sealed with gasket and hose clamp.

The $N_2$ bubbling through the bis(dimethylamino)methylsilane was adjusted to 1.5 on the flow meter (∼0.3 liter/minute) and flow was continued for 12 hours, using a total of 205 g of the silane. The flow was then stopped and the system allowed to stand intact for 64 hours. At the end of this time it required three seconds for the pipe to drop from a pressure of 5 to 0 psi, whereas at the beginning of the experiment the leaks in the pipe were so large that no pressure could be developed with the nitrogen regulator set at 10 psi.

EXAMPLE 4

The bell end of a three-inch bell and spigot pipe was utilized in an attempt to effect a seal around a straight section (not flared) of the pipe. The two sections of pipe were clamped together with pipe strap and the opening at the joint was packed with dry (not oiled) Oakum which had been soaked with water. There was no other sealing material, such as lead which is frequently used, utilized at the joint. When nitrogen was passed through the pipe, it was observed that there was a massive leak at the jute seal. With the nitrogen regulator set at 10 psi there was no pressure build up in the pipe.

The pipe was buried in eight inches of wet (10–12% $H_2O$) sand and a flow of $N_2$ bubbled through the bis(dimethylamino)methylsilane. The flow meter was adjusted to a reading of 1.0 (0.25 liter/minute), and the $N_2$-silane mixture flow was continued for 54 hours during which time 215 g of the silane were used. The flow was then stopped and the system was allowed to stand intact for 66 hours.

The flow of $N_2$-silane mixture was again started at 0.25 liters/minute. After 24 hours, the flow was stopped and the pipe was treated for 20 hours with $N_2$ at 1 psi bubbled through $H_2O$. This was followed by an additional 54 hours of $N_2$-silane mixture at 0.25 liter/minute. This last combined treatment time of 78 hours consumed 306 g of the bis(dimethylamino)methylsilane.

It was now observed that the original massive leak in the pipe had been reduced to a slow leak. That is, a slight pressure (∼2 psi) could be built up in the pipe and it required several seconds to leak out. The sand was removed so that the jute joint could be inspected. A tough polymer had formed completely around the joint, and, as the leak test indicated, it was estimated to be more than 90% sealed at 10 psi.

While the above examples were all carried out using bis(dimethylamino)methylsilane, it is clear that similar results will be obtained by the use of other aminosilanes within the ambit of the present invention and blends thereof. Indeed, appropriate blends, such as a mixture of bis(dimethylamino)dimethylsilane in combination with tris(dimethylamino)methylsilane results in a polymer on cohydrolysis which is similar to that obtained with room temperature vulcanizing silicone rubber. The sand or earth at the situs of the pipe leak acts as a weak reinforcing filler to give added strength. Even though the tris-compound noted above has a higher boiling point, i.e. a lower vapor pressure, than desired, when used in only small percentages of 1–5% of the silane blend, its partial pressure in the gas mixture makes it just as volatile as the bis(dimethylamino)dimethylsilane.

EXAMPLE 5

Under-ground gas pipe was sealed by the dynamic method using a mixture of 30 wt % bis-(dimethylamino)methylsilane, 60 wt % vinyl trimethoxysilane and 10 wt % tetramethoxysilane. Dynamic sealing was carried out over a period of approximately two months using levels of sealant of 200–500 parts by weight of sealant composition per million parts of gas. Results of this field test were excellent.

EXAMPLES 6–14

The following aminosilane sealant combinations are suitable for natural gas distribution systems:

(6) methylmethoxy dimethylaminosilane
(7) methylmethoxy dimethylaminosilane (30 wt %), vinyl trimethoxysilane (60 wt %) and methyl silicate (10 wt %)
(8) methylmethoxy dimethylaminosilane (40 wt %) and vinyl dimethoxy dimethylaminosilane (60 wt %)
(9) methylmethoxy dimethylaminosilane (40 wt %) and methyl dimethoxy dimethylaminosilane (60 wt %)
(10) methyl dimethoxy dimethylaminosilane
(11) methyl dimethoxy dimethylaminosilane (10–50 wt %) and dimethylmethoxy dimethylaminosilane (50–90 wt %)
(12) ethyl dimethoxy dimethylaminosilane
(13) propyl dimethoxy dimethylaminosilane
(14) When hydrolized, dimethyl bis-(dimethylamino)silane forms a liquid polymer and is ineffective as a sealant; therefore, this aminosilane cannot be used by itself in some environments. However, addition of as little as 2–5 mol % of trifunctional methyl tris-(dimethylamino)silane or methyl dimethoxy dimethylaminosilane to the difunctional dimethyl bis-(dimethylamino)silane results in a strong cross-linked seal on hydrolysis of the mixture.

EXAMPLE 15

Methyl methoxy dimethylaminosilane was prepared as follows: In a 100 gallon glass-lined kettle system there were placed 40 gallons of N-pentane solvent and 173 pounds (1.5 pound mols) of methyl dichlorosilane. Over a two hour period, a total of 48 pounds (1.5 pound mols) of anhydrous methyl alcohol was added to the kettle. The reaction mixture was heated to reflux to complete the esterification step and remove hydrogen chloride.

At this point the reaction mixture was cooled to be low room temperature and 140 pounds (3.1 pound mols) of dimethylamine was added to the pentane solution of partial ester with cooling during the addition. The reaction mixture was filtered to remove dimethylamine-HCl. The pentane solution of crude product was distilled to remove pentane and free dimethylamine. The crude product was distilled to obtain a fraction consisting primarily of the desired product.

The compounds methyldimethoxysilane; bis-(dimethylamino)methylsilane; methyl dimethoxy dimethylaminosilane and methyl methoxy-bis(dimethylamino)silane are formed in varying amounts as by-products in the reaction. However, as all of these compounds can be used in the aminosilane sealant composition of the invention, it is to be understood that the crude product can be similarly used.

Methyl dimethoxy dimethylaminosilane and dimethyl methoxy dimethylaminosilane were similarly prepared.

The instant invention has a number of advantages over the use of materials previously suggested. The end product is better, more flexible and more homogeneous; the starting compounds are safer, more stable and non-pyrophoric. No catalysts or gaseous organometallic compounds are necessary. The readily volatilizable compounds utilized form a leak sealing polymer under the proposed use conditions upon reaction with water or sand to form a self-sealing polysiloxane.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method of forming a seal at the situs of a leak located in a vessel by polymerizing an organic monomer at said situs, comprising introducing a sealant composition, comprising an admixture of up to 90 mol % of (1) an alkoxy silane monomer or an acetoxysilane or a mercaptosilane together with (2) an aminosilane monomer and in the absence of a metal alkyl or catalyst, into the interior of said vessel, said aminosilane monomer being readily volatilizable at the ambient temperature of said vessel and having the formula:

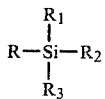

wherein
R is H, halogen or R', and R'' is alkyl of 1-4 carbons or vinyl;
$R_1$ is halogen, R', —OR, —NHR' or —N(R')$_2$;
$R_2$ is halogen, R', —OR, —NHR' or —N(R')$_2$; and
$R_3$ is —NHR' or —N(R')$_2$;
said sealant composition being introduced to said vessel under sufficient pressure and for a sufficient period of time to effect contact with said leak situs with said monomers in the vapor state and to effect polymerization of said monomers at said leak situs and sealing of the leak.

2. A method in accordance with claim 1, comprising, as a preliminary step, flushing said vessel with a moisture-laden gas inert to said sealant composition.

3. A method in accordance with claim 1, wherein said vessel is a pipe buried in sand.

4. A method in accordance with claim 1, wherein said vessel is a pipe buried in moist earth.

5. A method in accordance with claim 1, wherein said aminosilane is bis(dimethylamino)methylsilane.

6. A method in accordance with claim 1, wherein said aminosilane is selected from the group consisting of bis(dimethylamino)dimethylsilane; methoxy-dimethylamino-methylsilane; methoxy-bis(dimethylamino)-methylsilane: di-methoxy-dimethylamino-methylsilane; and methoxy-dimethyl-amino-dimethylsilane.

7. A method in accordance with claim 1, wherein said composition comprises approximately 30 wt % of bis(-dimethylamino)methylsilane, about 60 wt % vinyl trimethoxysilane and about 10 wt % tetramethoxysilane.

8. A method in accordance with claim 1, wherein said silane is carried in a gas inert thereto.

9. A method in accordance with claim 8, wherein said sealant composition is introduced into said vessel in a continuous manner at such a rate that the concentration of monomer vapor is in the range of 100-1,000 ppm.

10. A method in accordance with claim 1, carried out at a temperature of 30° F. to 190° F.

11. A method in accordance with claim 1, wherein $R_1$ is R' or —OR'; and $R_2$ is —OR or —N(R')$_2$.

12. A method in accordance with claim 1, wherein said vessel is a natural or fuel gas pipe, and said aminosilane is introduced, into natural or fuel gas continuously carried by said gas pipe, in an intermittent manner.

13. A sealed vessel obtained by the method of claim 1.

14. A sealed vessel obtained by the method of claim 9.

15. A method of forming a seal at the situs of a leak located in a vessel by polymerizing an organic monomer at said situs, comprising introducing a sealant composition, comprising 0-90 mol % of (1) an alkoxy silane monomer or an acetoxysilane monomer or a mercaptosilane monomer, and (2) 100-10 mol % of an aminosilane monomer comprising a vinyl amino silane, and in the absence of a metal alkyl or catalyst, into the interior of said vessel, said vinyl amino silane being readily volatilizable at the ambient temperature of said vessel, said sealant composition being introduced to said vessel under sufficient pressure and for a sufficient period of time to effect contact with said leak situs with said sealant composition in the vapor state and to effect polymerization of said sealant composition at said leak situs and sealing of the leak.

* * * * *

UNITED STATES PATENT AND TRADEMARK OFFICE
CERTIFICATE OF CORRECTION

PATENT NO. : 4,304,805
DATED : December 8, 1981
INVENTOR(S) : PACKO et al

It is certified that error appears in the above-identified patent and that said Letters Patent is hereby corrected as shown below:

Colum 8, line 14, delete "higher" and insert therefor --lower--; line 15, delete "high" and insert therefor --low--.

Signed and Sealed this

Twenty-fifth Day of September 1984

[SEAL]

Attest:

GERALD J. MOSSINGHOFF

Attesting Officer        Commissioner of Patents and Trademarks